United States Patent Office 3,032,577
Patented May 1, 1962

3,032,577
N-SUBSTITUTED DERIVATIVES OF AMINO-ALKYLSILOXANES
Edward L. Morehouse, Snyder, N.Y., assignor to Union Carbide Corporation, a corporation of New York
No Drawing. Filed Feb. 20, 1961, Ser. No. 90,222
5 Claims. (Cl. 260—448.2)

This invention relates to novel organosiloxanes and, more particularly, N-substituted derivatives of aminoalkylsiloxanes.

My novel organosiloxanes contain units of the formula:

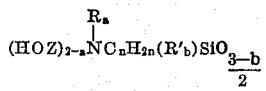

where R' is a monovalent hydrocarbon such as methyl, ethyl, vinyl, phenyl, cyclohexyl, and the like, —OZ— is the divalent group derived from a monoepoxide by opening of the oxirane ring, HO is interconnected to N through two carbon atoms, $a$ is an integer from 0 to 1, $n$ is an integer from 3 to 15, $b$ has a value from 0 to 2, inclusive, R is hydrogen, monovalent hydrocarbon or

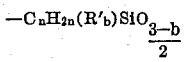

and the nitrogen atom is separated from the silicon atoms by at least three carbon atoms of each $C_nH_{2n}$ group. Thus, the organosiloxanes contemplated by this invention include those having the above formula as the unit formula and copolymeric siloxanes composed of units of the above formula and units of the formula:

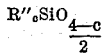

where R" is monovalent hydrocarbon and $c$ has a value from 1 to 3, inclusive. Cyclic siloxanes, linear siloxanes, e.g., oils and gums, siloxane resins, end-blocked siloxanes, disiloxanes, and the like, having the above formulas as included in my invention.

The organosiloxanes of this invention are advantageously produced by reacting a siloxane containing aminoalkylsiloxane units.

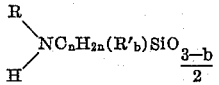

where R, R', $n$ and $b$ are as previously defined, with a monoepoxide. The reaction theoretically requires one mole of monoepoxide for each mole of amino hydrogen desired to be displaced, although in practice, greater or lesser amounts can be employed. The reaction is illustrated by the equation:

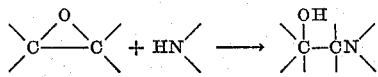

where

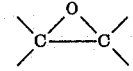

represents the monoepoxide and HN< represents the aminoalkylsiloxane unit-containing siloxane. The reaction is preferably carried out in the presence of a low molecular weight aliphatic alcohol or in the presence of a catalytic amount of water in which event lower temperatures and pressures can be used. For example, in the presence of a catalyst such as an aliphatic alcohol or water the reaction proceeds smoothly at room temperature and atmospheric pressure. However, in the absence of such a catalyst, high temperatures of over about 100° C. are required. When an alcohol catalyst is employed no superatmospheric pressures are required. For ease of reaction and ease of handling the reaction is carried out in a solvent such as methanol, cyclo-hexanol, dioxane, benzene, and the like. Other reaction conditions such as temperature and pressure are not narrowly critical.

Monoepoxides employed as starting materials in making the siloxanes of this invention are those organic compounds containing one epoxy group. By the term "epoxy" as used herein to designate a group or compound is meant a group composed of, or a compound containing, oxirane oxygen attached to two vicinal carbon atoms. Illustrative of suitable monoepoxides are the olefin oxides, e.g., ethylene oxide, propylene oxide, butadiene monoxide, 2,3-epoxycyclopentane; the substituted olefin oxides, e.g., styrene oxide, 2,3-epoxypropyl benzene; the epoxy alcohols, e.g., glycidol, 2,3-epoxycyclopentanol, 3,4 - epoxy-6-methylcyclohexylmethanol; the glycidyl ethers, e.g., phenyl glycidyl ether, butyl glycidyl ether; the glycidyl esters, e.g., glycidyl acetate, and the like.

Aminoalkylsiloxanes employed as starting materials in making my novel siloxanes are characterized by the usual basic silicon-to-oxygen-to-silicon interconnected structure of two or more silicon atoms and are further characterized by the attachment to silicon through carbon-to-silicon linkage of at least one aminoalkyl group. The remaining unfilled valences of silicon are predominantly satisfied by monovalent hydrocarbon groups such as those listed above and can also be satisfied by minor proportions of alkoxy groups and hydroxy groups such as are obtained respectively by partial hydrolysis and partial condensation of silanes employed in preparing said siloxanes. The aminoalkylsiloxane starting materials include cyclic siloxanes, siloxane oils and gums, end-blocked siloxanes, siloxane resins, disiloxanes, and the like. Thus, the starting aminoalkylsiloxanes can be represented as siloxanes containing the unit of the formula:

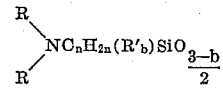

where R, R', $n$ and $b$ are as previously defined and can also contain units of the formula:

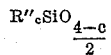

where R" and $c$ are as previously defined.

My novel organosiloxanes have been found to be useful in a variety of applications in the synthetic polymer art and have been found to be paritcularly useful as flocculating agents for aqueous dispersions of clay. When added to aqueous clay dispersions in amounts of as little as one weight percent based on the amount of water, my organosiloxanes cause rapid flocculation and settling of the clay.

Typical of the organosiloxanes made by my invention are those having the following unit formulas:

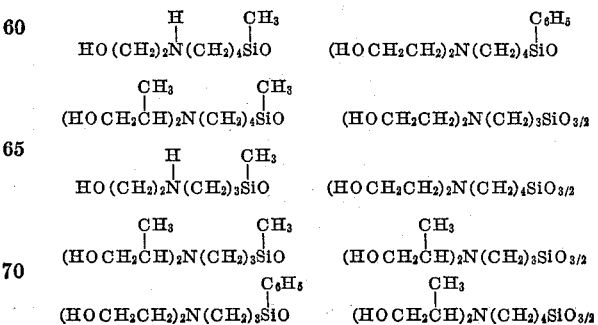

including copolymers composed of units of each of these formulas and, respectively, methylsiloxane units, dimethylsiloxane units, trimethylsiloxane units, phenylsiloxane units, diphenylsiloxane units, triphenylsiloxane units, vinylsiloxane units, divinylsiloxane units, methylvinylsiloxane units, phenylvinylsiloxane units, methylphenylsiloxane units, and dimethylphenylsiloxane units. Also, more specifically included are end-blocked linear polysiloxanes which can be broadly represented by the formula:

$$R''_3SiO(R''_2SiO)_y[(HOZ)_{2-a}NC_nH_{2n}(R')SiO]_xSiR''_3$$
$$\phantom{R''_3SiO(R''_2SiO)_y[(HOZ)_{2-a}NC_nH_{2n}(R')SiO]_x}|$$
$$\phantom{R''_3SiO(R''_2SiO)_y[(HOZ)_{2-a}NC_nH_{2n}(R')SiO]_xSi}R_a$$

where R, R', R'', —OZ—, n and a are as previously defined and need not be the same throughout the same molecule and x and y are numbers designating the relative proportions of R''$_2$SiO and $$(HOZ)_{2-a}NC_nH_{2n}(R')SiO$$
$$|$$
$$R_a$$

units contained by said siloxane, x has a value greater than zero but not greater than 1, y has a value from zero to less than 1 and the sum of x+y is equal to one. Representative end-blocked linear polysiloxanes made in accordance with this invention are:

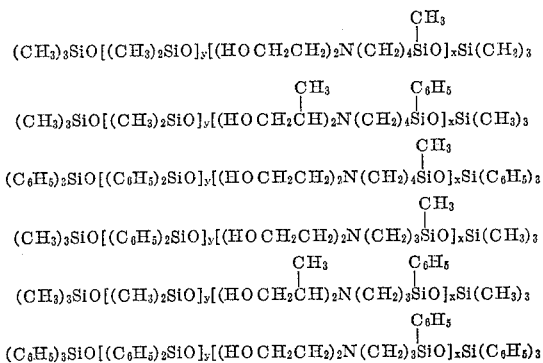

where x and y are as previously defined.

The following examples are presented.

*Example 1*

To a 500 cc. flask equipped with gas inlet tube, thermometer, magnetic stirrer and Dry Ice condenser was added methylsiloxane oil modified with 24 weight percent delta-aminobutylmethylsiloxy units, M.W. 1,000 (200 grams, 0.363 mole of N) and 75 cc. of absolute ethanol. Ethylene oxide (38.7 grams, 0.88 mole) was passed into the stirred solution over a period of about one hour. The reaction was exothermic and the temperature was maintained at 20° C. to 40° C. by external cooling. Stirring was continued for sixteen hours and then the reaction product was stripped at reduced pressure at 25° C. and lower on a Rinco Roto Evaporator until all the volatiles were removed. The product was a colorless, viscous oil having a viscosity of 1200 cps. The weight of product was 231 grams. Calculated weight for theoretical yield of the corresponding oil containing 35 weight percent (HOCH$_2$CH$_2$)$_2$N(CH$_2$)$_4$Si(CH$_3$)O units instead of H$_2$N(CH$_2$)$_4$Si(CH$_3$)O units is 232 grams. Infrared spectrum showed the absorption characteristics of COH, indicated evidence of amine groups of only tertiary nature and fits the structure shown above.

*Example 2*

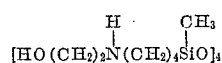

To a 500 cc. flask equipped with magnetic stirrer, Dry Ice condenser, gas inlet tube and thermometer was added delta-aminobutylmethylsiloxane cyclic tetramer (0.17 mole, 91.7 gram). The siloxane was stirred and heated to 150° C. The siloxane was maintained at 150° C. while ethylene oxide gas (0.68 mole, 30 grams) was passed into the liquid. The liquid became very viscous and mixing became very difficult, hence, the introduction of ethylene oxide was stopped. No ethylene oxide was found in a Dry Ice trap which had been placed beyond the Dry Ice condenser. This was evidence that all of the ethylene oxide had reacted with the siloxane. The reaction mixture was stripped to constant weight on a rotary stripper under reduced pressure at room temperature. The product having the formula shown above was a colorless, extremely viscous liquid. Only 0.7 gram of strippings was obtained, this being further evidence of essentially complete reaction of the ethylene oxide.

*Microanalysis.* — Calculated for (C$_7$H$_{17}$SiNO$_2$)$_4$: N=8.0. Found: N=8.0.

*Example 3*

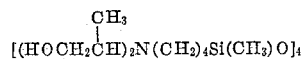

To a one-liter, three-necked flask equipped with mechanical stirrer, dropping funnel, reflux condenser, and drying tube was added delta-aminobutylmethylsiloxane cyclic tetramer (0.25 mole, 131 grams) and 150 cc. of absolute ethyl alcohol. Propylene oxide was added slowly from the dropping funnel, the reaction mixture being heated at reflux under atmospheric pressure during the major part of the addition. Refluxing was continued for four hours. Solvent and excess propylene oxide were then removed under reduced pressure at room temperature. The product was dissolved in benzene and stripping continued to constant weight. The product having the formula shown above was a clear, viscous fluid which weighed 256 grams. The calculated weight for N,N-bis-(alpha - methyl - beta - hydroxyethyl)delta - aminobutylmethylsiloxane cyclic tetramer is 247 grams. The refractive index, $n_D^{25}$, of the product was 1.4778. The refractive index of the silicone starting material delta-aminobutylmethylsilicone cyclic tetramer was 1.4680. The infrared spectrum exhibited strong absorption for COH and cyclic SiOSi but no NH$_2$ or

*Example 4*

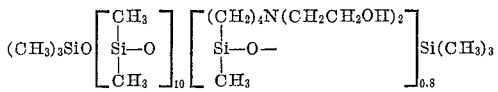

To a 500 cc. flask equipped with stirrer, gas inlet tube and thermometer was added 150 grams of a copolymer consisting of a 1000 M.W. dimethylsilicone oil having chemically combined therein 10 weight percent delta-aminobutylmethylsiloxy units and 150 cc. of methanol. Ethylene oxide gas (15 grams) was passed into the stirred oil. (No ethylene oxide was found later in a Dry Ice trap at the exit of the system.) The reaction mixture was stripped on a rotary stripper at reduced pressure to a maximum temperature of 50° C. The final stripped product was an oil having the above formula and a viscosity of 27 c.p.s. The viscosity of the starting oil was 18 c.p.s.

*Example 5*

To each of four separate test tubes was added 0.4 gram of powdered clay and 8 to 10 cc. of water. To test tubes 1, 2 and 3 was added, respectively, 0.1 gram of the N-substituted aminoalkylsiloxane of Example 1, 0.1 gram of delta-aminobutylmethyldiethoxysilane, and 0.1 gram of delta-aminobutylmethylsiloxane cyclic tetramer. Nothing further was added to test tube 4 which was maintained as a control. All test tubes were shaken vigorously to obtain dispersions and then the clay was allowed to settle. The performance of the contents of each test tube was given a rating based on the appearance of the mixtures contained thereby after standing one minute. These ratings are:

A=Excellent, i.e., rapid flocculation and settling of the clay leaving a substantially clear supernatant liquor.
B=Good.
C=Fair.
D=Poor.

The following results were obtained.

| Test tube: | Rating |
|---|---|
| 1 | A |
| 2 | D |
| 3 | D |
| 4 | D |

Using procedures similar to those described in Examples 1, 2, 3 and 4, there can be made the novel organosiloxanes having the first formula shown herein. Particularly useful organosiloxanes made in accordance with this invention are those represented by the first formula wherein, however, Z is a divalent hydrocarbon group and the hydroxyl group is interconnected to the aminonitrogen atom through two carbon atoms. Thus, Z is an ethylene group or a hydrocarbon-substituted ethylene group and includes such groups as $-CR'''_2CR'''_2-$ where $R'''$ is hydrogen or monovalent hydrocarbon. Illustrative of hydrocarbon-substituted ethylene groups are:

$$-CH_2\underset{(CH_2)_{13}CH_3}{\overset{|}{C}H}- \quad , -CH_2\underset{C_6H_4C_2H_5}{\overset{|}{C}H}- \quad -CH_2\underset{C_6H_5}{\overset{|}{C}H}- \quad , -CH_2\underset{C_2H_5}{\overset{CH_3}{\overset{|}{\underset{|}{C}}}}-$$

$$-CH_2\underset{CH_2C(CH_3)_3}{\overset{CH_3}{\overset{|}{\underset{|}{C}}}}- \quad , \underset{-CH-CH-}{\overset{CH_3\ CH_3}{\overset{|\ \ \ |}{\ }}} \quad -CH\underset{C(CH_3)_3}{\overset{CH_3}{\overset{|}{\underset{|}{C}H-}}} \quad , -CH\underset{(CH_2)_{10}CH_3}{\overset{(CH_2)_9CH_3}{\overset{|}{\underset{|}{C}H-}}}$$

and the like.

The polysiloxanes of this invention are also useful as complexing (coordinating) agents for removing metal ions, particularly cupric and ferric ions, from aqueous solution. For example, an aqueous solution of cupric acetate was shaken with a quantity of a dimethylpolysiloxane oil modified with 25 weight percent $$(HOCH_2CH_2)_2N(CH_2)_4Si(CH_3)O$$

units. A lavender complex was formed by the cupric ions and the polysiloxane. The lavender complex was separated from the aqueous solution by extraction with benzene. Analysis of the resulting aqueous solution showed that substantially all the copper had been removed.

This application is a continuation-in-part of my copending application Serial No. 727,527, filed April 10, 1958, now abandoned.

What is claimed is:
1. A siloxane having units of the formula:

$$(HOZ)_{2-a}\overset{R_a}{\overset{|}{N}}C_nH_{2n}(R'_b)SiO_{\frac{3-b}{2}}$$

wherein $R'$ is a monovalent hydrocarbon group, Z is selected from the class consisting of ethylene and hydrocarbon-substituted ethylene, HO is interconnected to N through two carbon atoms, $a$ is an integer from 0 to 1, $n$ is an integer from 3 to 15, $b$ has a value from 0 to 2 inclusive, R is a member of the class consisting of hydrogen, monovalent hydrocarbon and $$C_nH_{2n}(R'_b)SiO_{\frac{3-b}{2}}$$

and the nitrogen atom is separated from the silicon atoms by at least three carbon atoms of each $C_nH_{2n}$ group.

2. A siloxane having units of the formula:

$$HO(CH_2)_2\overset{H}{\overset{|}{N}}(CH_2)_4\overset{CH_3}{\overset{|}{Si}}O$$

3. A siloxane having units of the formula:

$$(HOCH_2\overset{CH_3}{\overset{|}{C}H})_2N(CH_2)_4\overset{CH_3}{\overset{|}{Si}}O$$

4. A copolymeric siloxane composed of (1) units of the formula:

$$(HOZ)_{2-a}\overset{R_a}{\overset{|}{N}}C_nH_{2n}(R'_b)SiO_{\frac{3-b}{2}}$$

where $R'$ is a monovalent hydrocarbon group, Z is selected from the class consisting of ethylene and hydrocarbon-substituted ethylene, HO is interconnected to N through two carbon atoms, $a$ is an integer from 0 to 1, $n$ is an integer from 3 to 15, $b$ has a value from 0 to 2 inclusive, R is a member of the class consisting of hydrogen, monovalent hydrocarbon and $$C_nH_{2n}(R'_b)SiO_{\frac{3-b}{2}}$$

and the nitrogen atom is separated from the silicon atoms by at least three carbon atoms of each $C_nH_{2n}$ group, and (2) units of the formula:

$$R''_cSiO_{\frac{4-c}{2}}$$

where $R''$ is a monovalent hydrocarbon group and $c$ has a value from 1 to 3 inclusive.

5. A siloxane having the formula:

$$(CH_3)_3SiO\left[\overset{CH_3}{\underset{CH_3}{\overset{|}{\underset{|}{Si}}O}}\right]_y\left[(HOCH_2CH_2)_2N(CH_2)_4\overset{CH_3}{\overset{|}{Si}}O\right]_xSi(CH_3)_3$$

where $y$ and $x$ are numbers designating the relative proportions of $(CH_3)_2SiO$ and $$(HOCH_2CH_2)_2N(CH_2)_4\overset{CH_3}{\overset{|}{Si}}O$$

unit contained by said siloxane, $x$ has a value greater than 0 but not greater than 1, $y$ has a value from 0 to less than 1, and the sum of $x+y$ is equal to 1.

No references cited.